United States Patent Office 3,532,689
Patented Oct. 6, 1970

3,532,689
3-OXIME AND 3-OXIME ESTERS OF 19-NORTESTOSTERONE
Arvin Pranlal Shroff, Piscataway, N.J., assignor to Ortho Pharmaceutical Corporation, a corporation of New Jersey
No Drawing. Continuation-in-part of applications Ser. No. 502,384, Oct. 22, 1965, and Ser. No. 563,081, July 6, 1966. This application Apr. 20, 1967, Ser. No. 635,308
Int. Cl. C07c *169/08*
U.S. Cl. 260—239.55          10 Claims

ABSTRACT OF THE DISCLOSURE 3-oximes and 3-oxime esters of 10-nortestosterones have post-coital activity for the suppression of reproduction.

---

This is a continuation-in-part of my applications Ser. No. 502,384 filed Oct. 22, 1965, now abandoned, and Ser. No. 563,081 filed July 6, 1966, now U.S. Pat. No. 3,437,674.

The novel compounds of the present invention are represented by the formula:

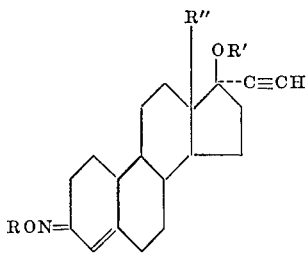

wherein R is hydrogen, an acyl group having from 2 to 8 carbon atoms or a tetrahydropyranyl group, R' is hydrogen or an acyl group having from 2 to 10 carbon atoms and R" is methyl or ethyl.

The compounds of the invention possess valuable pharmacologic activity as antilittering agents, and more particularly, as agents for the suppression of reproduction when given post-coitally.

The compounds of the invention are prepared by reacting a compound of the formula:

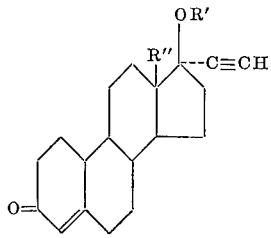

wherein R' and R" have the meaning given above, with a hydroxylamine salt in the presence of a base such as pyridine, sodium hydroxide or sodium acetate to form the corresponding 3-oxime. The 3-oxime may then be esterified by conventional means to prepare the 3-oxime ester.

Typical starting materials for the reaction are 17α-ethynyl-19-nortestosterone, which is disclosed in U.S. Pat. No. 2,774,777, and its esters. These compounds are known as ovulation suppressing agents which are used precoitally.

The following examples illustrate the invention:

EXAMPLE I

17α-ethynyl-17β-acetoxy-19-norandrost-4-en-3-one oxime

A solution of 2.0 g. of 17α-ethynyl-17β-acetoxy-19-norandrost-4-en-3-one, 10 ml. of pyridine and 1.0 g. of hydroxylamine hydrochloride is heated on a steam bath for one-half hour. The mixture is poured into a large amount of ice and water and the solid thus separated is collected by filtration. It is recrystallized from methanol-water to give 1.6 g. (78%) of 17α-ethynyl-17β-acetoxy-19-norandrost-4-en-3-one oxime, M.P. 229–230°. $\lambda_{max}$ 238 m$\mu$.

Calcd. for $C_{22}H_{29}NO_3$ (percent): C, 74.33; H, 8.22; N, 3.94. Found (percent): C, 74.39; H, 8.21; N, 4.01.

EXAMPLE II

17α-ethynyl-19-norandrost-4-en-17β-ol-3-one oxime

17α-ethynyl-19-norandrost-4-en-17β-ol-3-one (1.0 g.) is heated with 10 ml. of pyridine and 300 mg. of hydroxylamine hydrochloride on a steam bath for two hours. The solution is poured over a large amount of water and the precipitates thus formed are collected by filtration. recrystallization from methanol gives 17α-ethynyl-19-norandrost-4-en-17β-ol-3-one oxime, M.P. 112–114°.

Calcd. for $C_{20}H_{27}NO_2H_2O$ (percent): C, 72.47; H, 8.82; N, 4.23. Found (percent): C, 72.44; H, 9.12; N, 4.21.

EXAMPLE III

17β-caproyloxy-17α-ethynyl-19-norandrost-4-en-3-one oxime

Following the procedure of Example I, but starting with 17β-caproyloxy - 17α - ethynyl-19-norandrost-4-en-3-one, there is obtained 17β-caproyloxy-17α-ethynyl-19-norandrost-4-en-3-one oxime, M.P. 75–76°.

Calcd. for $C_{26}H_{37}NO_3$ (percent): C, 75.87; H, 9.06; N, 3.40. Found (percent): C, 75.66; H, 9.21; N, 3.14.

EXAMPLE IV

17β-propionyloxy-17α-ethynyl-19-norandrost-4-en-3-one oxime

Following the procedure of Example I, but starting with 17β-propionyloxy-17α-ethynyl-19-norandrost-4-en-3-one there is obtained 17β-propionyloxy-17α-ethynyl-19-norandrost-4-en-3-one oxime, M.P. 100–101°.

Calcd. for $C_{23}H_{31}NO_3$ (percent): C, 74.76; H, 8.46; N, 3.79. Found (percent): C, 74.78; H, 8.65; N, 3.17.

EXAMPLE V

17β-decanoyloxy-17α-ethynyl-19-norandrost-4-en-3-one oxime

Following the procedure of Example I, but starting with 17β - decanoyloxy-17α-ethynyl-19-norandrost-4-en-3-one, there is obtained 17β-decanoyloxy-17α-ethynyl-19-norandrost-4-en-3-one oxime, M.P. 128–129.5°.

Calcd. for $C_{30}H_{45}NO_3$ (percent): C, 77.04; H, 9.70; N, 3.00. Found (percent): C, 77.12; H, 9.87; N, 3.27.

In like manner there are prepared:

17α-ethynyl-13β-ethyl-gon-4-en-17β-ol-3-one oxime,
17α-ethynyl-17β-capropyloxy-13β-ethyl-gon-4-en-3-one oxime, and
17α-ethynyl-17β-decanoyloxy-13β-ethyl-gon-4-en-3-one oxime.

EXAMPLE VI

N,17β-diacetoxy-17α-ethynyl-19-norandrost-4-en-3-one oxime

A solution containing 3.0 g. of 17α-ethynyl-17β-acetoxy-19-norandrost-4-en-3-one oxime in 5.0 ml. of pyridine is treated with 9.0 ml. of acetic anhydride and stirred at room temperature for 15 minutes. The mixture is poured into a large amount of ice and water and neutralized with ammonium hydroxide. The solid portion is collected by filtration, dried and recrystallized from hexane to give N,17β-diacetoxy-17α-ethynyl-19-norandrost-4-en-3-one oxime, M.P. 142–144° C.

$\lambda_{max.}^{EtOH}$ 243 mμ.

Calcd. for $C_{24}H_{31}NO_4$ (percent): C, 72.51; H, 7.86; N, 3.52. Found (percent): C, 72.54; H, 8.01; N, 3.73.

EXAMPLE VII

N-iso-butyryloxy-17β-acetoxy-17α-ethynyl-19-norandost-4-en-3-one oxime

A solution containing 3.0 g. of 17α-ethynyl-17β-acetoxy-19-norandrost-4-en-3-one oxime in 10 ml. of pyridine is treated with 10 ml. of isobutyric anhydride. The mixture is stirred at room temperature for 15 minutes, and poured into a large amount of ice and water. The semi-solid material is extracted with ethyl acetate and the organic layer is washed with water, dried over sodium sulfate and evaporated. The solid is recrystallized from hexane to give N-isobutyryloxy-17β-acetoxy-17α-ethynyl-19-norandrost-4-en-3-one oxime, M.P. 150–151° C.

$\lambda_{max.}^{EtOH}$ 244 mμ.

Calcd. for $C_{28}H_{35}NO_4$ (percent): C, 73.38; H, 8.29; N, 3.29. Found (percent): C, 73.31; H, 8.31; N, 3.53.

EXAMPLE VIII

N-propionyloxy-17β-acetoxy-17α-ethynyl-19-norandrost-4-en-3-one oxime

Following the procedure of Example VI or VII, but using propionic anhydride as the esterifying agent, N-propionyloxy - 17β - acetoxy-17α-ethynyl-19-norandrost-4-en-3-one oxime is recrystallized from hexane, M.P. 152–154° C.

$\lambda_{max.}^{EtOH}$ 244 mμ.

Calcd. for $C_{25}H_{33}NO_4$ (percent): C, 72.96; H, 8.08; N, 3.40. Found (percent): C, 72.69; H, 8.24; N, 3.49.

EXAMPLE IX

N-caproyloxy-17β-acetoxy-17α-ethynyl-19-norandrost-4-en-3-one oxime

Following the procedure of Example I or II, but using caproic anhydride as the esterifying agent, N-caproyloxy-17β-acetoxy-17α-ethynyl - 19 - norandrost - 4 - en-3-one oxime is recrystallized from hexane, M.P. 102–104°.

$\lambda_{max.}^{EtOH}$ 243 mμ.

Calcd. for $C_{28}H_{39}NO_4$ (percent): C, 74.14; H, 8.67; N, 3.09. Found (percent): C, 74.03; H, 8.55; N, 3.33.

EXAMPLE X

N-acetoxy-17β-caproyloxy-17α-ethynyl-19-norandrost-4-en-3-one oxime

Following the procedure of Example VI, but starting with 17β-caproyloxy - 17α - ethynyl - 19 - norandrost-4-en-3-one oxime, there is obtained N-acetoxy-17β-caproyloxy-17α-ethynyl-19-norandrost-4-en-3-one oxime, M.P. 110–112°.

Calcd. for $C_{28}H_{30}NO_2$ (percent): C, 74.14; H, 8.69; N, 3.13. Found (percent): C, 74.10; H, 8.69; N, 3.13.

EXAMPLE XI

N-(2'tetrahydropyranyloxy)-17β-acetoxy-17α-ethynyl-19-norandrost-4-en-3-one oxime 17β - acetoxy - 17α - ethynyl-19-norandrost-4-en-3-one oxime (0.5 g.) is treated with 20.0 ml. of dry benzene, 0.2 of p-toluenesulfonic acid and 10 ml. of dihydropyran and is stirred at room temperature for 0.5 hour. The mixture is treated with a large amount of ice and water followed by extraction with ethyl acetate. The organic layer is dried over sodium sulfate and evaporated. Repeated crystallization from methylene chloride-hexane gives N-(2'-tetrahydropyranyloxy) - 17β - acetoxy - 17α - ethynyl-19-norandrost-4-en-3-one oxime, M.P. 172–174°.

Calcd. for $C_{27}H_{37}NO_4$ (percent): C, 73.77; H, 8.48; N, 3.19. Found (percent): C, 74.08; H, 8.32; N, 3.45.

EXAMPLE XII

DL-13β-ethyl-17α-ethynyl-17β-acetoxy-gon-4-en-3-one oxime

A solution containing 4.5 g. of DL-13β-ethyl - 17α-ethynyl-17β-acetoxy-gon-4-en-3-one in 15 ml. of pyridine and 2.0 g. of hydroxylamine hydrochloride is heated on a steam bath for 45 minutes. It is cooled and poured into a large amount of ice and water. The solid material thus formed is collected by filtration and air dried. It is recrystallized from methylene chloride-alcohol mixture to give 4.2 g. of DL-13β-ethyl-17α-ethynyl-17β-acetoxy-gon-4-en-3-one oxime, M.P. 226–228°.

Calcd. for $C_{23}H_{31}NO_3$ (percent): C, 74.76; H, 8.46; N, 3.79. Found (percent): C, 74.84; H, 8.75; N, 3.90.

In like manner there are prepared:

N,17β-diacetoxy-17α-ethynyl-13β-ethyl-gon-4-en-3-one oxime,
N-iso-butyryloxy-17β-acetoxy-17α-ethynyl-13β-ethyl-gon-4-en-3-one oxime,
N-propionyloxy-17β-acetoxy-17α-ethynyl-13β-ethyl-gon-4-en-3-one oxime,
N-caproyloxy-17β-acetoxy-17α-ethynyl-13β-ethyl-gon-4-en-3-one oxime,
N-acetoxy-17β-caproyloxy-17α-ethynyl-13β-ethyl-gon-4-en-3-one oxime, and
N-(2'-tetrahydropyranyloxy)-17β-acetoxy-17α-ethynyl-13β-ethyl-gon-4-en-3-one oxime.

The antilittering effect of a compound is determined by the following procedure:

(1) The compound to be tested is administered in the diet or by gavage for 7 days to both male and female rats, with the sexes segregated.

(2) Treatment is continued for 15 days during which the rats are permitted to cohabit freely.

(3) The sexes are again segregated and are observed for 21 days with no treatment.

A control group is similarly treated except that the compound is not administered.

The females are observed for pregnancies and the size of litters.

The minimum effective dose (MED) is the amount of the compound in milligrams per kilogram of animal body weight per day (mg./kg./day), which completely suppresses the production of litters.

TABLE I

| Compound administered: | MED, mg./kg./day |
| --- | --- |
| 17α - ethynyl - 17β - acetoxy - 19 - norandrost 4-en-3-one oxime | 0.25 |
| 17α - ethynyl - 19 - norandrost - 4 - en - 17β-ol-3-one oxime | 0.25 |
| N,17β - diacetoxy - 17α - ethynyl - 19 - norandrost-4-en-3-one oxime | 0.25 |
| N - propionyloxy - 17β - acetoxy - 17α-ethynyl-19-norandrost-4-en-3-one oxime | 1.00 |
| N - isobutyryloxy - 17β - acetoxy - 17α-ethynyl-19-norandrost-4-en-3-one oxime | 1.00 |
| N - caproyloxy - 17β - acetoxy - 17α - ethynyl-19-norandrost-4-en-3-one oxime | 1.00 |
| N - (2' - tetrahydropyranyloxy) - 17β-acetoxy-17α-ethynyl-19-norandrost-4-en-3-one oxime | 0.5 |
| 17β - caproyloxy -17α - ethynyl - 19 - norandrost-4-en-3-one oxime | 0.25 |
| 17β - propionyloxy - 17α - ethynyl - 19 - norandrost-4-en-3-one oxime | 0.25 |
| 17α - ethynyl - 19 - nortestosterone | 20.0 |
| 17α - ethynyl-17β-acetoxy-19-nortestosterone | 5.0 |

It will be observed from Table I above that 17α-ethynyl - 17β - acetoxy - 19 - norandrost-4-en-3-one oxime eliminates the production of litters in rats at a dose of 0.25 mg. per kilogram of body weight per day, while a daily dosage of 5.0 mg./kilogram of body weight of its precursor 17α-ethynyl-17β-acetoxy-19-nortestosterone is required to accomplish the total suppression of litters. It will also be observed that 0.25 mg. per kilogram of body weight per day of 17α - ethynyl - 19 - norandrost-4-en-17β-ol-3-one oxime totally suppresses rat litters while 20.0 mg. per kilogram of body weight per day of its precursor 17α-ethynyl-19-nortestosterone is required to accomplish total suppression of rat litters.

In order to determine the post-coital effect of a compound, female rats of the Wistar strain are fed a compound by gavage on specific days of gestation after sperm are observed in the vagina. The rats are sacrificed and the uterii are examined for implantation and resorbtion sites.

In the following table, day 0 is the day of which sperm is observed in vaginal washings and the compond tested was 17α-ethynyl-17β-acetoxy - 19 - norandrost-4-en-3-one oxime.

TABLE II

| Dose (mg./kg.) | Day of administration | Pregnant/total | Implantations Normal | Resorbed |
|---|---|---|---|---|
| 10 | 0 | 6/10 | 25 | 0 |
| 10 | 1 | 0/5 | 0 | 0 |
| 10 | 2 | 0/5 | 0 | 0 |
| 10 | 3 | 1/5 | 7 | 2 |
| 10 | 4 | 1/5 | 0 | 11 |
| 5 | 1 | 1/5 | 0 | 2 |
| 5 | 2 | 0/5 | 0 | 0 |
| 1 | 1 | 4/5 | 30 | 3 |
| 1 | 2 | 4/5 | 12 | 2 |
| 20 | 0 | 2/5 | 0 | 12 |
| 40 | 0 | 1/5 | 0 | 1 |

It will be observed from Table II that in the species treated, the compound was most efficacious at dose levels of 10 mg./kg. and 5 mg./kg. on days 1 and 2 of pregnancy.

It is believed that the compounds of the invention act post-coitally by lysing the zygote and that this action is most effective from between 36 to 60 hours after fertilization of the ovum.

What is claimed is:
1. A compound of the formula:

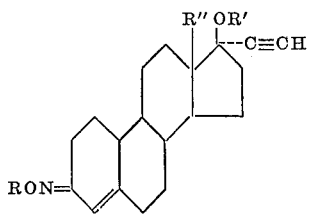

wherein R is selected from the group consisting of acyl of from 2 to 8 carbon atoms, R' is selected from the group consisting of hydrogen and acyl of from 2 to 10 carbon atoms, and R" is selected from the group consisting of methyl and ethyl.

2. A compound of the formula:

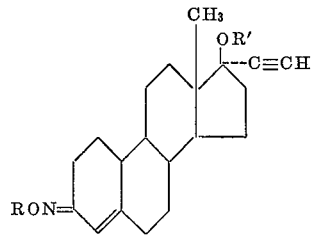

wherein R is selected from the group consisting of acyl of from 2 to 8 carbon atoms and R' is selected from the group consisting of hydrogen and acyl of from 2 to 10 carbon atoms according to claim 1.

3. N - acetoxy -17α - ethynyl - 19 - norandrost-4-en-17β-ol-3-one oxime according to claim 2.

4. N,17β - diacetoxy - 17α - ethynyl-19-norandrost-4-en-3-one oxime according to claim 2.

5. N - iso - butyryloxy - 17α - ethynyl-17β-acetoxy-19-norandrost-4-en-3-one oxime according to claim 2.

6. N - propionyloxy - 17α - ethynyl-17β-acetoxy-19-norandrost-4-en-3-one oxime according to claim 2.

7. N - caproyloxy - 17α - ethynyl-17β-acetoxy-19-norandrost-4-en-3-one oxime according to claim 2.

8. N - acetoxy -17α - ethynyl - 17β - caproyloxy - 19-norandrost-4-en-3-one oxime according to claim 2.

9. N - (2' - tetrahydropyranyloxy) - 17α - ethynyl-17β-acetoxy-19-norandrost-4-en-3-one oxime.

10. DL - 13β - ethyl - 17α - ethynyl-17β-acetoxy-gon-4-en-3-one oxime.

References Cited

UNITED STATES PATENTS 3,060,205 10/1962 Schwenk et al. ____ 260—397.5
3,299,107 1/1967 Mazur _____ 260—397.5

OTHER REFERENCES

Smith et al.: Journ. Chem. Soc., November, 1964, pp. 4472–4492, 4473–4476 and 4489 pertinent.

ELBERT L. ROBERTS, Primary Examiner

E. G. LOVE, Assistant Examiner

U.S. Cl. X.R.
260—397.5; 424—238